(12) United States Patent
Takamura et al.

(10) Patent No.: US 8,942,007 B2
(45) Date of Patent: Jan. 27, 2015

(54) ELECTRICAL COMPONENT

(75) Inventors: Naoki Takamura, Makinohara (JP); Tohru Kurosawa, Fujieda (JP)

(73) Assignee: Yazaki Corporation, Tokyo (JP)

( * ) Notice: Subject to any disclaimer, the term of this patent is extended or adjusted under 35 U.S.C. 154(b) by 80 days.

(21) Appl. No.: 13/639,571

(22) PCT Filed: Apr. 12, 2011

(86) PCT No.: PCT/JP2011/059098
§ 371 (c)(1),
(2), (4) Date: Oct. 5, 2012

(87) PCT Pub. No.: WO2011/129337
PCT Pub. Date: Oct. 20, 2011

(65) Prior Publication Data
US 2013/0033826 A1 Feb. 7, 2013

(30) Foreign Application Priority Data
Apr. 14, 2010 (JP) ................................. 2010-093346

(51) Int. Cl.
H01R 13/24 (2006.01)
H04N 5/225 (2006.01)
H01R 12/58 (2011.01)
H01R 12/70 (2011.01)

(52) U.S. Cl.
CPC .......... *H01R 13/2407* (2013.01); *H04N 5/2251* (2013.01); *H01R 12/58* (2013.01); *H01R 12/7035* (2013.01)
USPC ....................................................... 361/801

(58) Field of Classification Search
USPC .................... 361/679.01, 748, 784, 796, 801; 439/571
See application file for complete search history.

(56) References Cited

U.S. PATENT DOCUMENTS 5,462,454 A 10/1995 Kramer et al.
5,588,844 A * 12/1996 Sipe ................................ 439/65

(Continued)

FOREIGN PATENT DOCUMENTS

CA 2241507 A1 12/1998
CN 1700521 A 11/2005

(Continued)

OTHER PUBLICATIONS

Office Action issued Aug. 20, 2013, by the Korean Intellectual Property Office in corresponding application No. 10-2012-7022772.

(Continued)

*Primary Examiner* — Bernard Rojas
(74) *Attorney, Agent, or Firm* — Sughrue Mion, PLLC

(57) ABSTRACT

An electronic component includes a circuit element, a circuit board that is connected to the circuit element, and a connection terminal that is connected to the circuit board. The connection terminal includes a main body, a spring member that is formed so as to be elastically deformable in two directions including a direction of moving closer to the circuit board disposed on the main body and a direction of moving away from the circuit board, and a pair of arm portions that is extended from the main body so as to position the spring member therebetween. The pair of arm portions passes through the circuit board, ends of the respective arm portions far from the main body are bent toward the spring member, and the circuit board is held between the ends and the spring member.

5 Claims, 8 Drawing Sheets

(56) References Cited

U.S. PATENT DOCUMENTS

| | | | |
|---|---|---|---|
| 5,797,769 A * | 8/1998 | Yang et al. | 439/571 |
| 6,022,243 A * | 2/2000 | Yang et al. | 439/567 |
| 6,106,332 A | 8/2000 | Souisa | |
| 7,744,408 B2 * | 6/2010 | Komatsu | 439/567 |
| 2005/0239345 A1 | 10/2005 | Furuno et al. | |
| 2008/0102652 A1 | 5/2008 | Masaki et al. | |
| 2008/0153363 A1 | 6/2008 | Ma | |

FOREIGN PATENT DOCUMENTS

| | | |
|---|---|---|
| CN | 101183754 A | 5/2008 |
| CN | 101212095 A | 7/2008 |
| CN | 201285854 Y | 8/2009 |
| EP | 0 632 543 A2 | 1/1995 |
| JP | 2001110487 A | 4/2001 |
| JP | 2003-142181 A | 5/2003 |
| JP | 2003142181 A | 5/2003 |
| JP | 200999411 A | 5/2009 |
| WO | 98/16977 A1 | 4/1998 |

OTHER PUBLICATIONS

International search Report dated May 24, 2011 from the International Searching Authority in counterpart international application No. PCT/JP2011/059098.

Extended Search Report dated Jan. 30, 2014 issued by the European Patent Office in counterpart European Application No. 11768858.0.

English translation of Written Opinion dated May 24, 2011 issued by the International Searching Authority in counterpart International Application No. PCT/JP2011/059098 (PCT/ISA/237).

Office Action, dated Jun. 6, 2014, issued by the State Intellectual Property Office in counterpart Chinese Application No. 201180011622.9.

Office Action drafted Jan. 30, 2014 issued by the Japanese Patent Office in counterpart Japanese Patent Application No. 2010-093346.

* cited by examiner

ELECTRICAL COMPONENT

The present invention relates to an electrical component such as a CCD camera unit which is mounted, for example, in an automobile as a moving body.

BACKGROUND ART

For example, an electrical component such as a CCD camera unit 101 is mounted in an automobile as a moving body. As illustrated in FIG. 12, the CCD camera unit 101 includes a first case 102 that is formed into a box shape having an opening, a circuit board 104 that is fitted (incorporated) in the first case 102, a camera lens element 106 that is mounted on the circuit board 104, spring members 103 that are fitted on a surface of the circuit board 104 opposite to the camera lens element 106, a second case 105 that is incorporated to cover the opening of the first case 102, and connection terminals 107 that are fitted to the second case 105 so as to be electrically connected to the spring members 103 (for example, refer to Patent Literature 1).

As illustrated in FIG. 13, the spring members 103 are formed to be elastically deformable in two directions (direction of an arrow Z) including a direction of moving the first case 102 and the second case 105 closer to each other for incorporation and a direction of moving the first case 102 and the second case 105 away from each other. Also, the connection terminals 107 extend toward the first case 102, and when the first case 102 and the second case 105 are incorporated together, the spring members 103 elastically contact with the connection terminals 107 to electrically connect the connection terminals 107 and the spring members 103 with each other.

CITATION LIST

Patent Literature

Patent Literature 1: JP-A-2009-99411

SUMMARY OF THE INVENTION

Problems to be Solved by the Invention

However, the above-mentioned conventional CCD camera unit 101 suffers from the following problems. That is, in the conventional CCD camera unit 101, even if predetermined contacts of the spring members 103 and the connection terminals 107 are displaced by an assembly error of the first case 102 and the circuit board 104, or a slight strain or inclination caused by an influence of the assembly error of the first case 102 and the second case 105, the displacement is absorbed by elastic displacement (that is, elastic deformation) of the spring members 103. For that reason, there is a need to ensure a space for elastically deforming the spring members 103, and there is a tendency to upsize the conventional CCD camera unit 101 in a direction (direction of an arrow Z) of elastically deforming the spring members 103.

Also, for example, when the spring members 103 and the connection terminals 107 are displaced due to vibration of the above-mentioned traveling automobile to the degree that cannot be absorbed by the elastic displacement (that is, elastic deformation) of the spring members 103, the amount of elastic displacement of the spring members 103 fluctuates, and a stable contact load cannot be maintained. Under the circumstance, the electric connection of the spring members 103 and the connection terminals 107 may be cut. Thus, it is difficult to keep the excellent connection state of the spring members 103 and the connection terminals 107.

Under the circumstance, the present invention has been made in view of the above-mentioned problems, and aims at providing an electrical component that keeps an excellent connection state of the circuit board and the connection terminals connected to the circuit board, and is downsized.

Means for Solving the Problems

The above-mentioned object of the present invention has been achieved by the following configurations.

(1) An electronic component including a circuit element; a circuit board that is connected to the circuit element; and a connection terminal that is connected to the circuit board, wherein the connection terminal includes: a main body; a spring member that is formed so as to be elastically deformable in two directions including a direction of moving closer to the circuit board disposed on the main body and a direction of moving away from the circuit board; and a pair of arm portions that is extended from the main body so as to position the spring member therebetween; and wherein the pair of arm portions passes through the circuit board, ends of the respective arm portions far from the main body are bent toward the spring member, and the circuit board is held between the ends and the spring member.

(2) In the electrical component having the configuration of the above item (1), an insulating plate is disposed between the circuit board and the circuit element; a concave portion that is recessed in a surface of the plate on which the circuit board is placed is formed in the plate at a position facing the connection terminal, and an inner peripheral surface of the concave portion is formed with a pair of inclined portions that is inclined in a direction of moving the pair of arm portions closer to each other as the inclined portions move farther from the surface or a pair of curved portions formed in a direction of moving the pair of arm portions closer to each other as the curved portions move away from the surface, at a position that abut against the ends of the pair of arm portions.

MODE FOR CARRYING OUT THE INVENTION

A CCD camera unit 1 as an electrical component according to an embodiment of the present invention will be described with reference to FIGS. 1 to 10.

Figure 1:
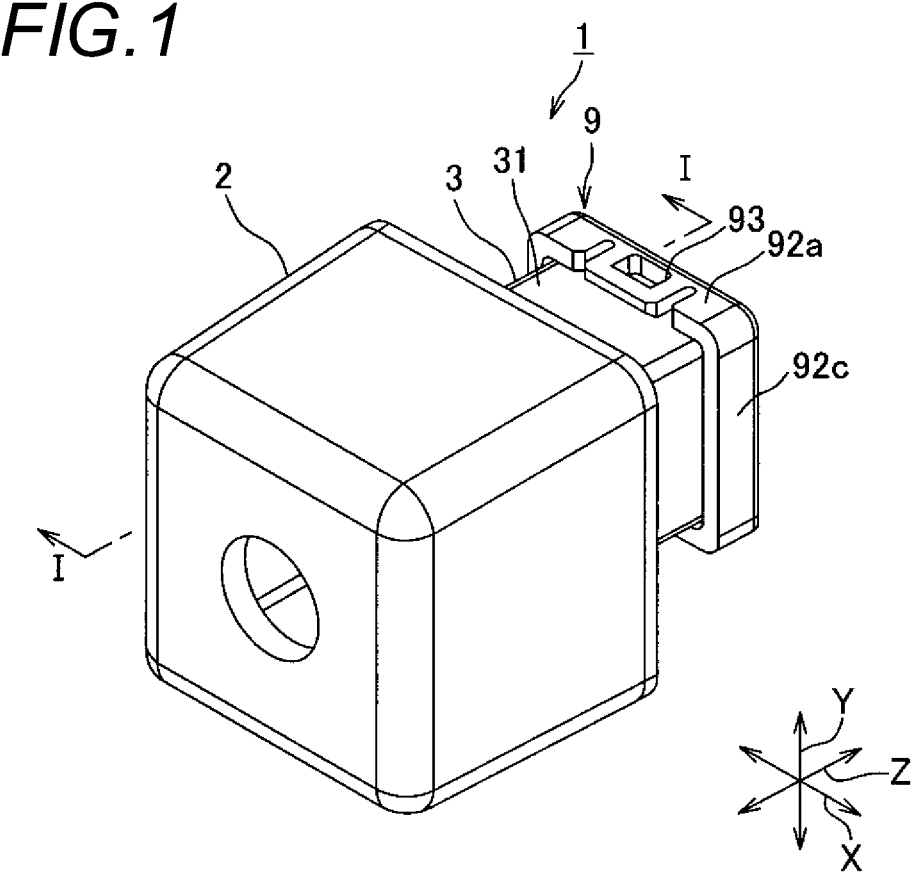
FIG. 1 is a perspective view of an overall CCD camera unit according to an embodiment of the present invention.
Figure 2:
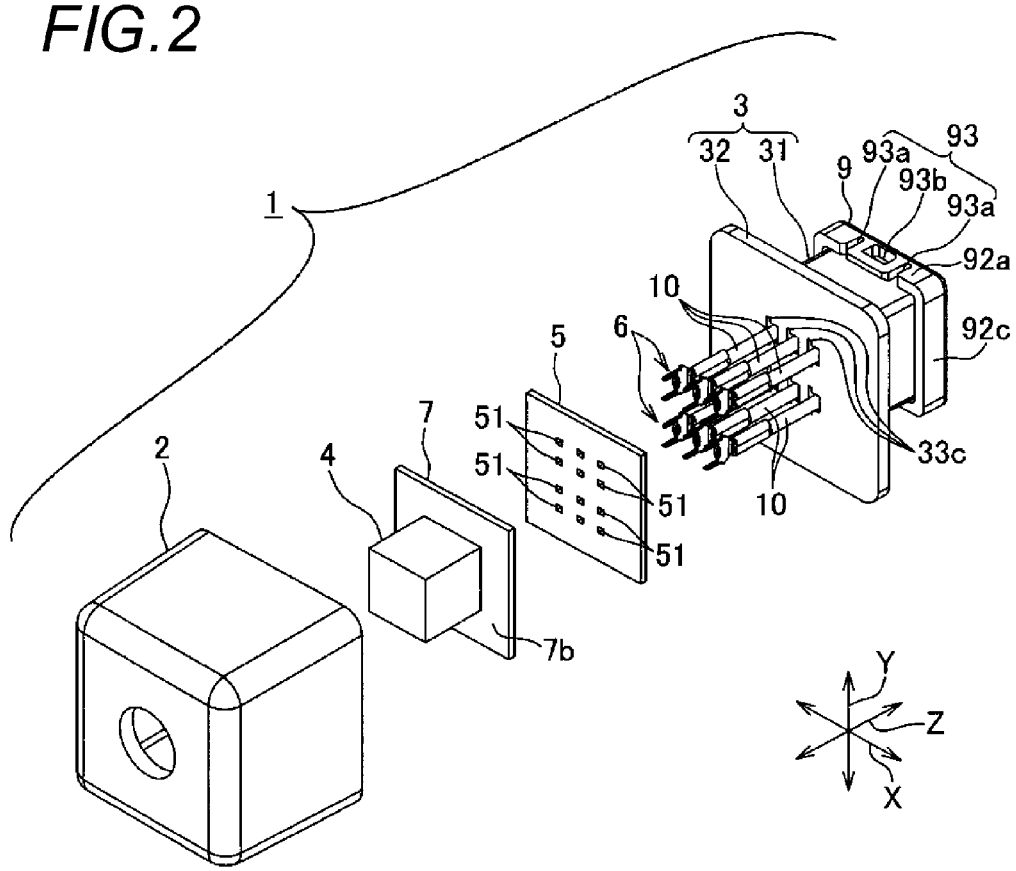
FIG. 2 is an exploded perspective view illustrating the taken-apart CCD camera unit illustrated in FIG. 1.

The CCD camera unit 1 illustrated in FIGS. 1 and 2 includes a camera case 2 that is formed into a box shape having an opening, a connection connector 3 that is incorporated in the camera case 2 so as to cover the opening, a camera lens element 4 as a circuit element housed in the camera case 2, a circuit board 5 that is connected to the camera lens element 4, a plurality of connection terminals 6 that pass through the connection connector 3, and is connected to the circuit board 5, an insulating plate 7 that is disposed between the circuit board 5 and the camera lens element 4, a mat seal 8, and a rear holder 9 that is fitted to the connection connector 3. Also, the plurality of connection terminals 6 is each connected to an electric wire 10, and a plurality of the electric wires 10 supplies an electric power from a power supply to the camera lens element 4, transmits a control signal to the camera lens element 4, and transmits a control signal from the camera lens element 4.

Also, an arrow Z illustrated in FIG. 1 represents a direction of elastically deforming a spring member 66 disposed in each of the connection terminals 6 which will be described later, a direction of moving the connection terminals 6 closer to the circuit board 5, and a direction of incorporating the camera case 2 and the connection connector 3 together. An arrow Y represents a direction along which a pair of arm portions 67 disposed in each of the connection terminals 6 faces each other (that is, direction along which the pair of arm portions 67 moves closer to each other). An arrow X represents a direction intersecting with (orthogonal to) both directions of the arrow Z and the arrow Y.

The above connection connector 3 is made of an insulating synthetic resin. Also, the connection connector 3 includes a rectangular connector main body 31, and a flange portion 32 that is disposed on an end of the connector main body 31 on the camera case 2 side, extends from the end in a flanged shape, and covers the opening of the camera case 2.

Figure 5:
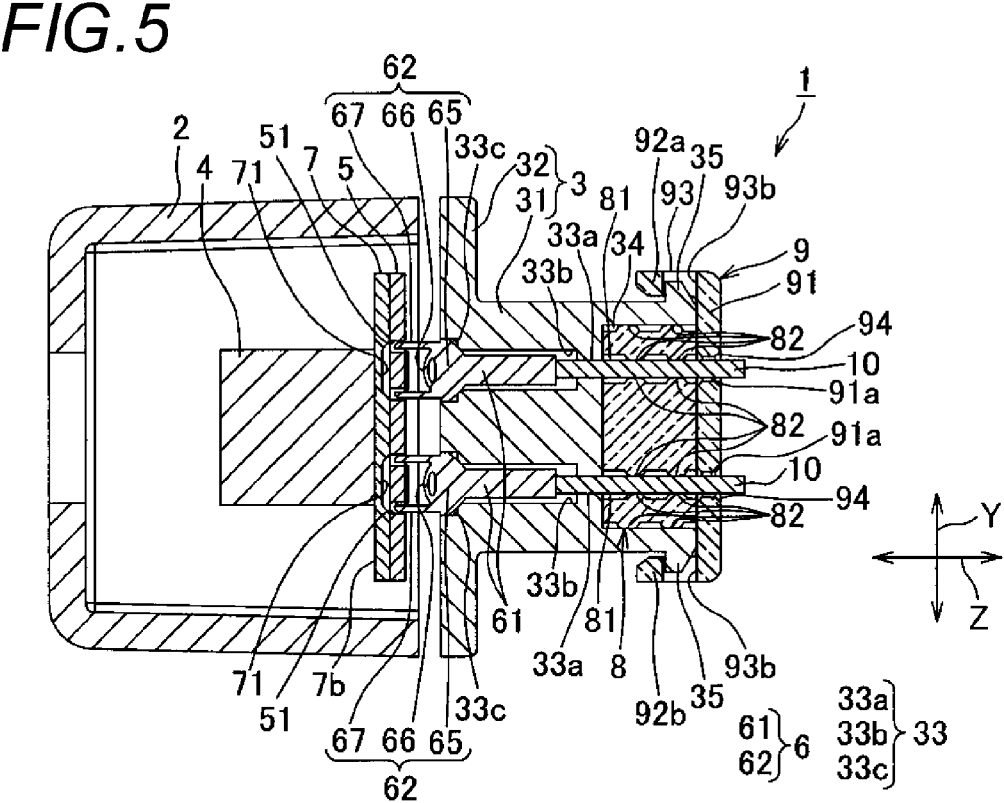
FIG. 5 is an illustrative view illustrating a work of assembling the CCD camera unit illustrated in FIG. 1, which illustrates an appearance that the connection terminal passes through the circuit board.

As illustrated in FIG. 5, the connector main body 31 includes a plurality of through-holes 33 through which the respective connection terminals 6 and the respective electric wires 10 equipped with the connection terminals 6 passes, a mat seal press fit portion 34 into which a mat seal 8 is press, and locking portions 35 that are locked with the rear holder 9. The plurality of through-holes 33 is formed on the camera case 2 side of the connector main body 31, and the mat seal press fit portion 34 communicates with the plurality of through-holes 33, and is disposed on a side of the connector main body 31 far from the camera case 2.

The plurality of through-holes 33 is disposed in three along the arrow X, and disposed in two along the arrow Y in an example illustrated in the drawings. Also, the plurality of through-holes 33 is formed at a distance from each other. Also, the respective through-holes 33 penetrate through the connector main body 31 (that is, connection connector 3) in the direction of the arrow Z. Also, each of the through-holes 33 includes a first through-hole 33a that houses the electric wire 10, a second through-hole 33b that communicates with the first through-hole 33a, and houses a portion of the electric wire 10 to which a wire connection portion 61 of each connection terminal 6 is fitted, which will be described later, and a third through-hole 33c that communicates with the second through-hole 33b, and houses a portion of the electric wire 10 to which an electric contact portion 62 of each connection terminal 6 is fitted, which will be described later. Also, the third through-hole 33c is formed so that an inner diameter of the third through-hole 33c is larger than that of the second through-hole 33b and the first through-hole 33a, and the second through-hole 33b is formed so that an inner diameter of the second through-hole 33b is larger than that of the first through-hole 33a. Also, the third through-hole 33c is disposed on an end of the connection connector 3 at the camera case 2 side, the second through-hole 33b is disposed farther from the camera case 2 than the third through-hole 33c, and the first through-hole 33a is disposed farther from the camera case 2 than the second through-hole 33b.

The mat seal press fit portion 34 is recessed in an end of the connector main body 31 far from the camera case 2 in the direction of the arrow Z.

A pair of the locking portions 35 is disposed on an end of the connector main body 31 far from the camera case 2 in the direction of the arrow Z. The pair of locking portions 35 is protruded from a surface of the connector main body 31 in a direction of moving away from each other in the direction of the arrow Y.

Figure 4:
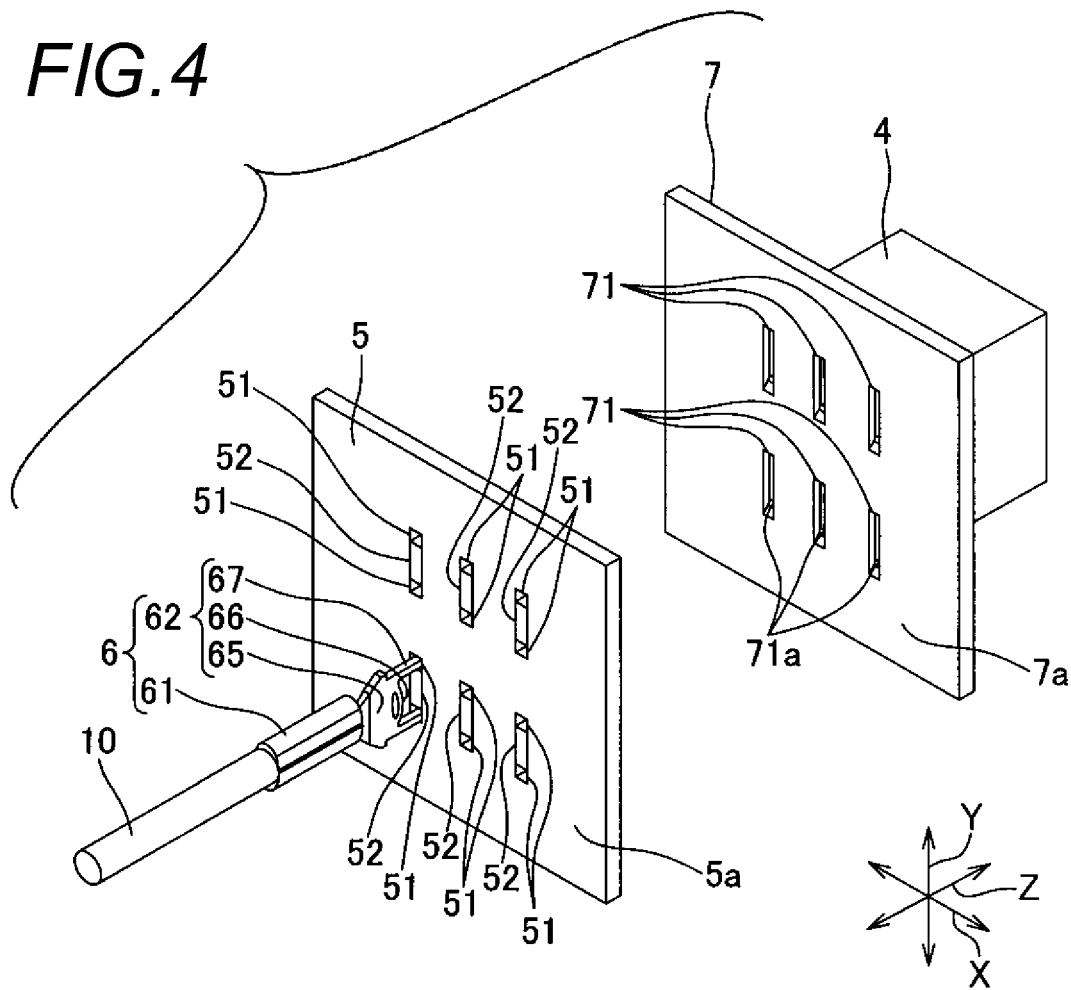
FIG. 4 is an illustrative view illustrating a work of assembling the CCD camera unit illustrated in FIG. 1, which illustrates an appearance that the connection terminal is fitted onto a circuit board.

The circuit board 5 is connected with the camera lens element 4. Also, the circuit board 5 is formed with wiring patterns that connect the camera lens element 4 with the connection terminals 6 in a predetermined pattern. On the circuit board 5, each wiring pattern of the circuit board 5 is connected to the camera lens element 4 through an electric wire or an FPC. Also, the circuit board 5 is disposed closer to the connection connector 3 side than the camera lens element 4. Also, as illustrated in FIG. 4, the circuit board 5 is formed with plural pairs of through-holes 51 through which the pair of arm portions 67 in each of the connection terminals 6 passes, and board contacts 52 formed between each pair of through-holes 51. Also, the circuit board 5 is fitted to the camera case 2 so that a surface 5a on which the wiring patterns (that is, board contacts 52) are formed trends toward the connection connector 3 side. Also, when the circuit board 5 is fitted to the camera case 2, the circuit board 5 is located slightly deeper than an end of the camera case 2 at the connection connector 3 side in the direction of the arrow Z (far from connection connector 3). Each pair of the through-holes 51 in the circuit board 5 is located at a position facing each pair of the arm portions 67 disposed in the connection terminals 6, which will be described later, along the arrow Z.

The plural pairs of through-holes 51 are located at positions that communicate with the respective through-holes 33 of the connection connector 3. Also, each pair of through-holes 51 is located at a distance from each other along the arrow Y. Also, each of the through-holes 51 penetrates through the circuit board 5 in the direction of the arrow Z.

The spring member 66 of each connection terminal 6, which will be described later, elastically contacts with the board contact 52. Also, the spring member 66 of the connection terminal 6 elastically contacts with the board contact 52 to electrically connect the circuit board 5 with the connection terminals 6.

Figure 3:
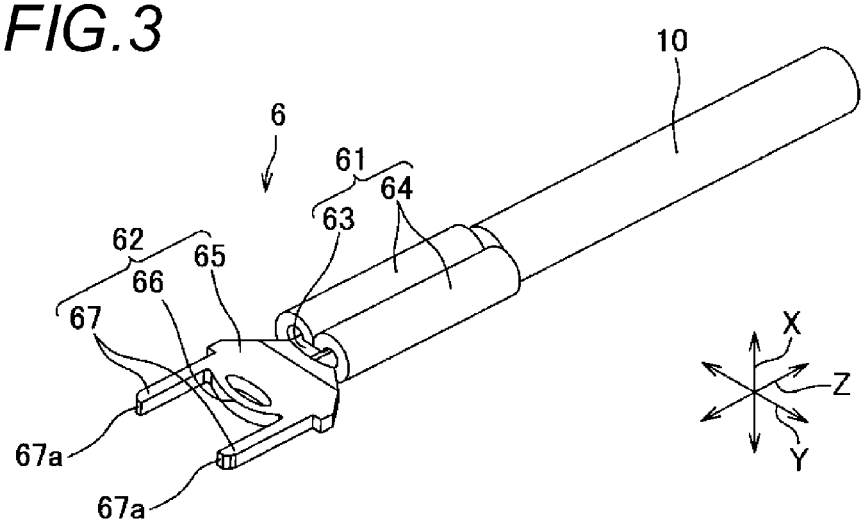
FIG. 3 is a perspective view illustrating each connection terminal configuring the CCD camera unit illustrated in FIG. 1.

Each of the connection terminals 6 is obtained by punching out or bending an electrically conductive plate. As illustrated in FIG. 3, each of the connection terminals 6 has the wire connection portion 61 and the electric contact portion 62 integrated together.

The wire connection portion 61 includes a bottom plate 63, which is formed into a plate rectangular shape, and a pair of core crimping pieces 64 erected from both edges of the bottom plate 63 in the width direction (arrow Y) integrated together. Also, a longitudinal direction (arrow Z) of the wire connection portion 61 and a longitudinal direction of the electric wire 10 connected to the wire connection portion 61 are parallel to each other.

The pair of core crimping pieces 64 is bent in such a manner that edges of the core crimping pieces 64 on a side far from the bottom plate 63 move closer to the bottom plate 63. The pair of core crimping pieces 64 crimps a core brought into a state where a sheath portion of the electric wire 10 is peeled off and exposed in cooperation with the bottom plate 63, and crimps the core, to thereby electrically connect the core crimping pieces 64 with the core of the electric wire 10.

The electric contact portion 62 includes a main body 65 continuous to the bottom plate 63, the spring member 66 disposed on the main body 65, which is formed to be elastically deformable in two directions (arrow Z) of a direction of moving closer to the circuit board 5 and a direction of moving away from the circuit board 5, and the pair of arm portions 67 each erected from the main body 65 in the direction of the arrow Z in a bar shape so that the spring member 66 is located between those arm portions 67.

The spring member 66 is provided with a space for elastically deforming the spring member 66 in the direction of the arrow Z. The space is disposed in the center of the spring member 66. Also, as described above, the space is obtained in the connection terminal 6 by punching out the electrically conductive plate.

Figure 10:
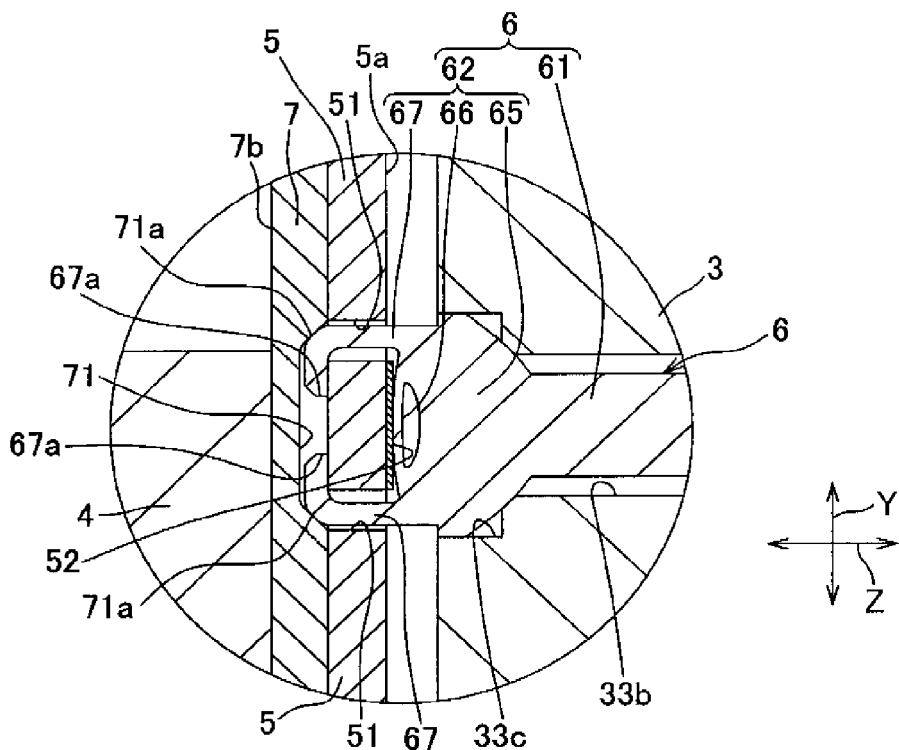
FIG. 10 is an enlarged view illustrating an enlarged main portion illustrated in FIG. 9.

The pair of arm portions 67 passes through the through-holes 51 of the circuit board 5, and is then bent toward the spring member 66 so that respective ends 67a of the pair of arm portions 67 far from the main body 65 nip the circuit board 5 therebetween (illustrated in FIG. 10). Also, when the ends 67a of the pair of arm portions 67 are bent toward the spring member 66 so as to hold the circuit board 5 therebetween, each board contact 52 of the circuit board 5 elastically contact with the spring member 66.

As illustrated in FIG. 4, a plurality of concave portions 71 that is recessed in a surface 7a of the plate 7 on which the circuit board 5 is placed is formed in the plate 7. The respective concave portions 71 are located at positions communicating with the respective pairs of through-holes 51. That is, the respective concave portions 71 are located at positions facing the connection terminals 6 along the arrow Z. Also, an inner peripheral surface of each concave portion 71 is formed with a pair of inclined portions 71a that is inclined in a direction of moving the pair of arm portions 67 closer to each other as the inclined portions 71a move farther from the surface 7a of the plate 7, at positions that abut against the respective ends 67a of the pair of arm portions 67. Also, the camera lens element 4 is fitted on a surface 7b opposite to the surface 7a of the plate 7.

The mat seal 8 is made of a synthetic resin having flexibility such as rubber, and formed into a rectangular shape. Also, as illustrated in FIG. 5, the mat seal 8 is formed with wire through-holes 81 through which the electric wires 10 fitted with the connection terminals 6 pass, and a plurality of convex portions 82. Also, the mat seal 8 prevents liquid such as water from entering the inside of the connection connector 3.

A plurality of the wire through-holes 81 is provided. Also, the respective wire through-holes 81 are located to communicate with the through-holes 33 of the connection connector 3, and penetrate through the mat seal 8 in the direction of the arrow Z. The electric wires 10 each fitted with the connection terminal 6 are pressed into the wire respective through-holes 81 so that the connection terminals 6 and the electric wires 10 each fitted with the connection terminal 6 are fitted to the mat seal 8.

The plurality of convex portions 82 is protruded from an outer surface of the mat seal 8 in the direction of the arrow Y so as to move away from each other. Further, the plurality of convex portions 82 is also formed on an inner surface of each wire through-hole 81, and protruded in a direction of moving closer to each other from the inner surface in the direction of the arrow Y.

The rear holder 9 includes a plate cover portion 91 placed on the mat seal 8 pressed into the connection connector 3, and a plurality of side wall portions 92a, 92b, and 92c erected from an edge of the cover portion 91 toward the mat seal 8 in the direction of the arrow Z. The rear holder 9 is formed into a bottomed cylinder.

The cover portion 91 is formed with hole portions 94 through which the electric wires 10 each fitted with the connection terminal 6 pass. A plurality of the hole portions 94 is formed. The plurality of hole portions 94 is located at positions communicating with the wire through-holes 81 of the mat seal 8. Also, the respective hole portions 94 penetrate through the cover portion 91 in the direction of the arrow Z. Also, an inner surface of each hole portion 94 is formed with a convex portion 91a protruded from the inner surface.

A pair of side wall portions 92a and 92b facing each other in the direction of the arrow Y among the plurality of side wall portions 92a, 92b, and 92c is each equipped with a lock receiving portion 93 that is locked with the locking portion 35 of the connection connector 3.

As illustrated in FIGS. 2 and 5, the lock receiving portion 93 includes a pair of slits 93a, and a locking hole portion 93b formed between the pair of slits 93a. The pair of slits 93a is formed at a distance from each other along an arrow X. Also, the respective slits 93a are linearly notched toward the cover portion 91 from ends of the side wall portions 92a and 92b far from the cover portion 91 in the direction of the arrow Z. The locking hole portion 93b penetrates through the respective side wall portions 92a and 92b. The lock receiving portion 93 is formed with the pair of slits 93a so as to be elastically deformably formed in a direction of moving away from each other in the direction of the arrow Y.

The above-mentioned CCD camera unit 1 is assembled as described below. First, respective terminals of the electric wires 10 pass through the hole portions 94 of the rear holder 9, the wire through-holes 81 of the mat seal 8, and the through-holes 33a, 33b, and 33c of the connection connector 3 in the stated order. In the terminal of the electric wire 10 protruded from the flange portion 32, the core brought into a state where the sheath portion of the electric wire 10 is peeled off and exposed is placed on the bottom plate 63 of the wire connection portion 61 of the connection terminal 6. The core crimping pieces 64 are so swaged as to come closer to the bottom plate 63 so that the connection terminal 6 is fitted to the electric wire 10. Then, the electric wire 10 fitted with the connection terminal 6 is pulled in a direction of moving away from the camera case 2 in the direction of the arrow Z, and the electric contact portion 62 of the connection terminal 6 is housed in the third through-hole 33c. Thereafter, only the mat seal 8 is moved closer to the camera case 2 while the electric wire 10 is pulled in the direction of moving away from the camera case 2 in the direction of the arrow Z. Then, after mat seal 8 has been pressed into the mat seal press fit portion 34, the rear holder 9 is moved closer to the camera case 2.

Figure 6:
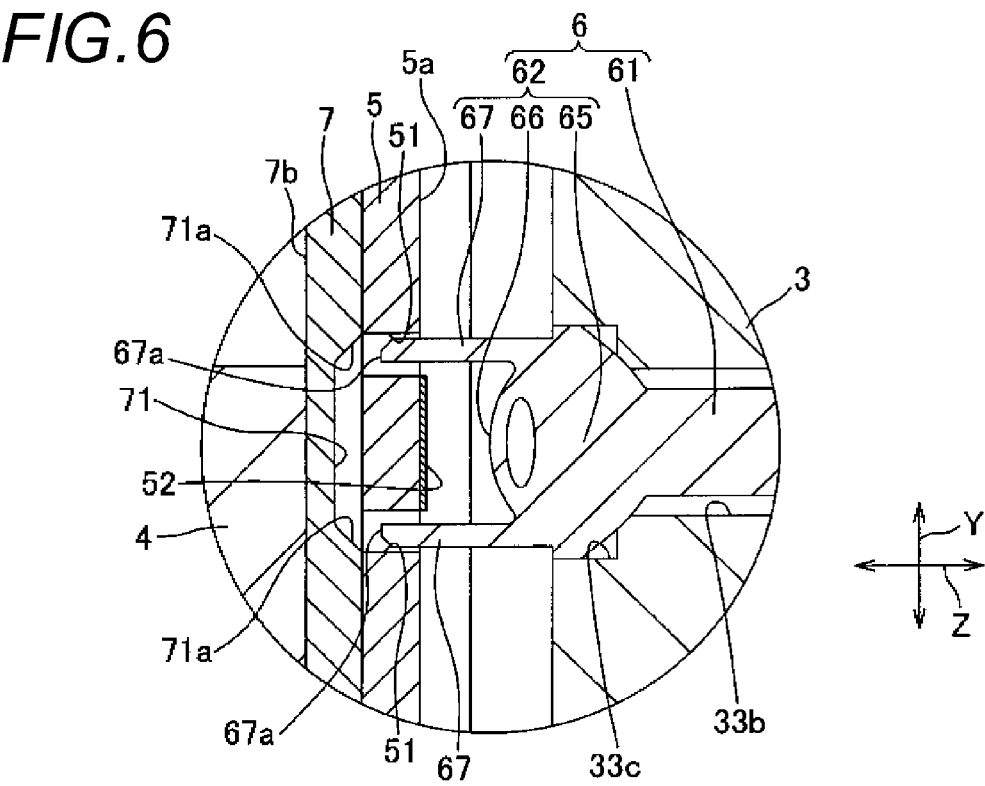
FIG. 6 is an enlarged view illustrating an enlarged main portion illustrated in FIG. 5.

Then, as illustrated in FIGS. 5 and 6, the locking portions 35 of the connection connector 3 are locked with the lock receiving portions 93 of the rear holder 9. Thus, the rear holder 9 is fitted to the connection connector 3. When the rear holder 9 is thus fitted to the connection connector 3, each connection terminal 6 and the electric wire 10 fitted with the connection terminal 6 are fitted to the connection connector 3 through the mat seal 8. In this situation, the spring member 66 and the pair of arm portions 67 of each connection terminal 6 are protruded from the connection connector 3 along the arrow Z.

Then, after the camera lens element 4 has been fitted onto the surface 7b of the plate 7, the circuit board 5 is placed on the surface 7a of the plate 7 so that the concave portions 71 of the plate 7 communicate with the through-holes 51 of the circuit board 5, and the circuit board 5 is fitted to the plate 7. The camera lens element 4 and the circuit board 5 are connected to each other through an electric wire and an FPC. In this situation, the camera lens element 4 and the circuit board 5 are connected by soldering one end of the electric wire or the FPC and the camera lens element, and connected by soldering the other end of the electric wire or the FPC and the wiring pattern of the circuit board 5. Thus, the camera lens element 4 and the circuit board 5 are electrically connected to each other. Then, the circuit board 5 fitted with the camera lens element 4 through the plate 7 is fitted to the camera case 2. In this situation, the circuit board 5 is arranged so that the surface 5a formed with the wiring pattern trends toward the connection connector 3 side, and the through-holes 51 of the circuit board 5 are arranged to face each pair of arm portions 67 fitted to the connection connector 3.

Figure 7:
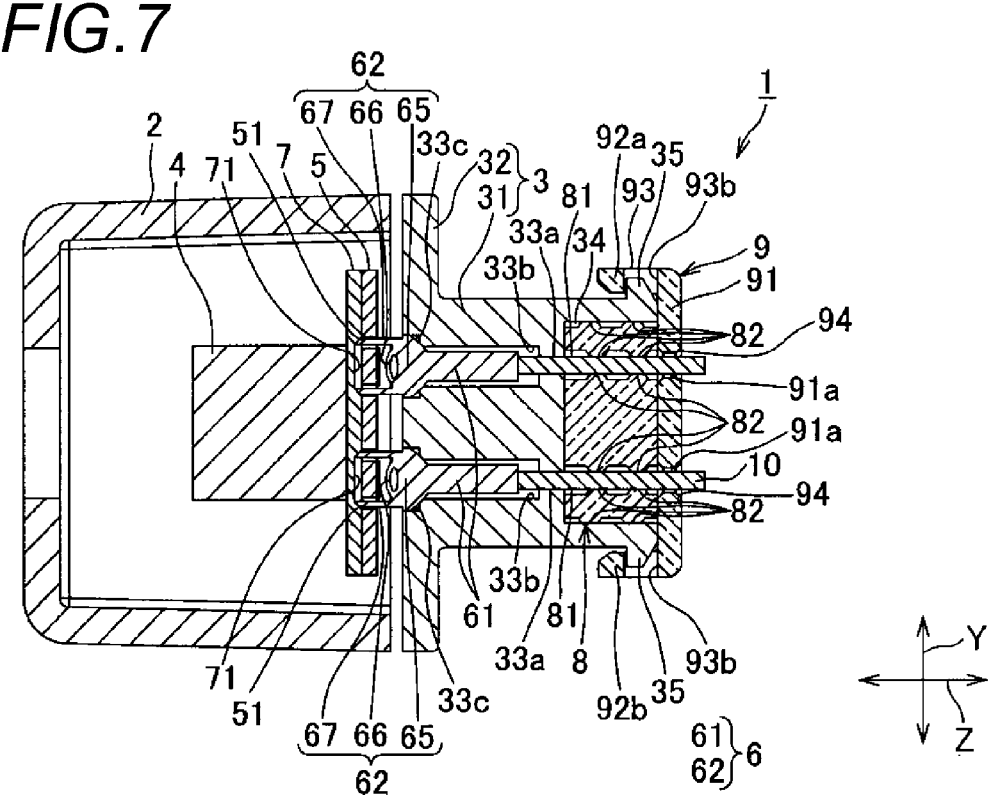
FIG. 7 is an illustrative view illustrating a work of assembling the CCD camera unit illustrated in FIG. 1, which is a cross-sectional view illustrating a state in which an arm portion of the connection terminal pass through the circuit board, and abuts against an inclined portion of a plate.
Figure 8:
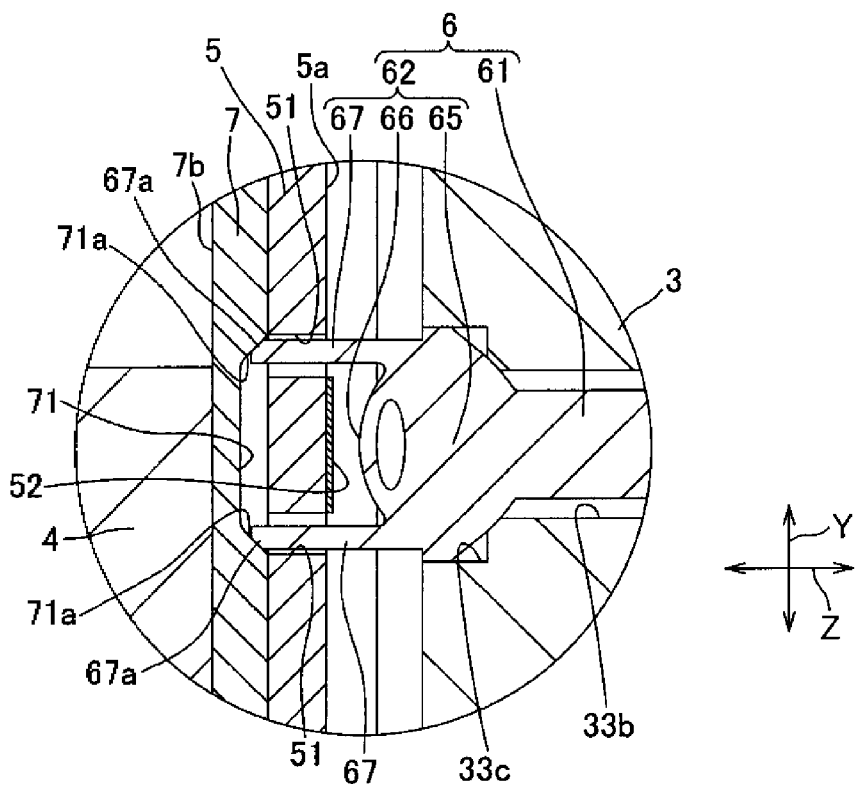
FIG. 8 is an enlarged view illustrating an enlarged main portion illustrated in FIG. 7.

Then, as illustrated in FIGS. 7 and 8, the camera case 2 and the connection connector 3 move closer to each other so as to cover the opening of the camera case 2. As the camera case 2 and the connection connector 3 gradually come closer to each other, each pair of arm portions 67 of the plural connection terminals 6 is allowed to pass through the through-holes 51, and the ends 67a of each pair of arm portions 67 are abutted against the inclined portions 71a of the concave portions 71 of the plate 7.

Figure 9:
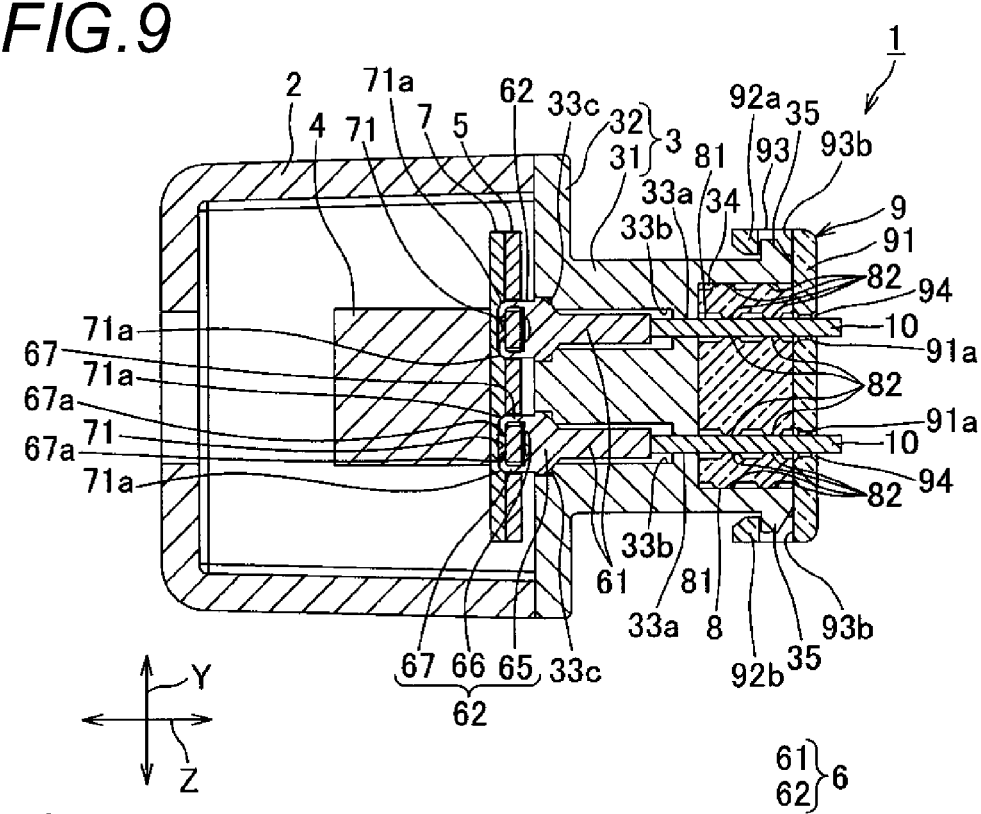
FIG. 9 is a cross-sectional view taken along a line I-I illustrated in FIG. 1.

Further, as illustrated in FIGS. 9 and 10, as the camera case 2 and the connection connector 3 come closer to each other, the ends 67a of the pair of arm portions 67 are bent toward the spring member 66 along the inclined portions 71a, and the circuit board 5 is held between the ends 67a of the pair of the arm portions 67 and the spring member 66. Thus, the circuit board 5 is held between the pair of arm portions 67 so that the connection terminals 6 and the circuit board 5 are fixed to each other. In this situation, the spring member 66 elastically contact with the board contacts 52 of the circuit board 5 so that the connection terminals 6 and the circuit board 5 are electrically connected with each other, and the camera case 2 is incorporated to the connection connector 3. Thus, the CCD camera unit 1 is assembled.

According to the above-mentioned embodiment, there is provided the CCD camera unit 1 as the electronic component including the camera lens element 4 as the circuit element, the circuit board 5 that is connected to the camera lens element 4, and the connection terminal 6 that is connected to the circuit board 5. In the CCD camera unit 1, the connection terminal 6 includes the main body 65, the spring member 66 that is formed to be elastically deformable in two directions (direction of the arrow Z) including the direction of moving closer to the circuit board 5 disposed in the main body 65 and the direction of moving away from the circuit board 5, and the pair of arm portions 67 that is erected from the main body 65 so as to position the spring member 66 therebetween. In the CCD camera unit 1, the pair of arm portions 67 is allowed to pass through the circuit board 5, and the ends 67a of the respective arm portions 67 far from the main body 65 are bent toward the spring member 66, and the circuit board 5 is held between the ends 67a and the spring member 66. With the above configuration, the connection terminals 6 fixes the circuit board 5 so as to control the movement of the circuit board 5 in the two directions (arrow Z) of the direction of coming closer to the connection terminals 6 and the direction of moving away from the connection terminals 6, and the direction (arrow Y) along which the pair of arm portions 67 face each other. Accordingly, even when the above-mentioned automobile vibrates during traveling, the spring member 66 maintains the stable contact load whereby there can be provided the CCD camera unit 1 that keeps the excellent connection state of the circuit board 5 and the connection terminals 6 connected with the circuit board 5.

Also, the ends 67a of the pair of arm portions 67 are bent toward the spring member 66 to hold the circuit board 5 between the ends 67a and the spring member 66. As a result, the circuit board 5 is fixed by the connection terminals 6 so as to control the movement of the circuit board 5 in the direction (arrow Z) of moving away from the connection terminals 6. Accordingly, since the amount of elastic displacement of the spring member 66 can be reduced as compared with that of the conventional spring member 66, the CCD camera unit 1 can be lowered in height (that is, downsized).

Also, the insulating plate 7 is disposed between the circuit board 5 and the camera lens element 4. The concave portions 71 which are recessed in the surface 7a of the plate 7 on which the circuit board 5 is placed are formed in the plate 7 at the position facing the connection terminals 6. The inner peripheral surface of each concave portion 71 is formed with the pair of inclined portions 71a that is inclined in the direction of moving the pair of arm portions 67 closer to each other as the inclined portions 71a move farther from the surface 7a, at positions that abut against the respective ends 67a of the pair of arm portions 67. Therefore, the ends 67a of the pair of arm portions 67 are guided along the inclined portions 71a, and bent toward the spring member 66. With the provision of the inclined portions 71a, the circuit board 5 and the connection terminals 6 can be connected to each other by the easy work of pushing the connection terminals 6 against the plate 7.

Figure 11:
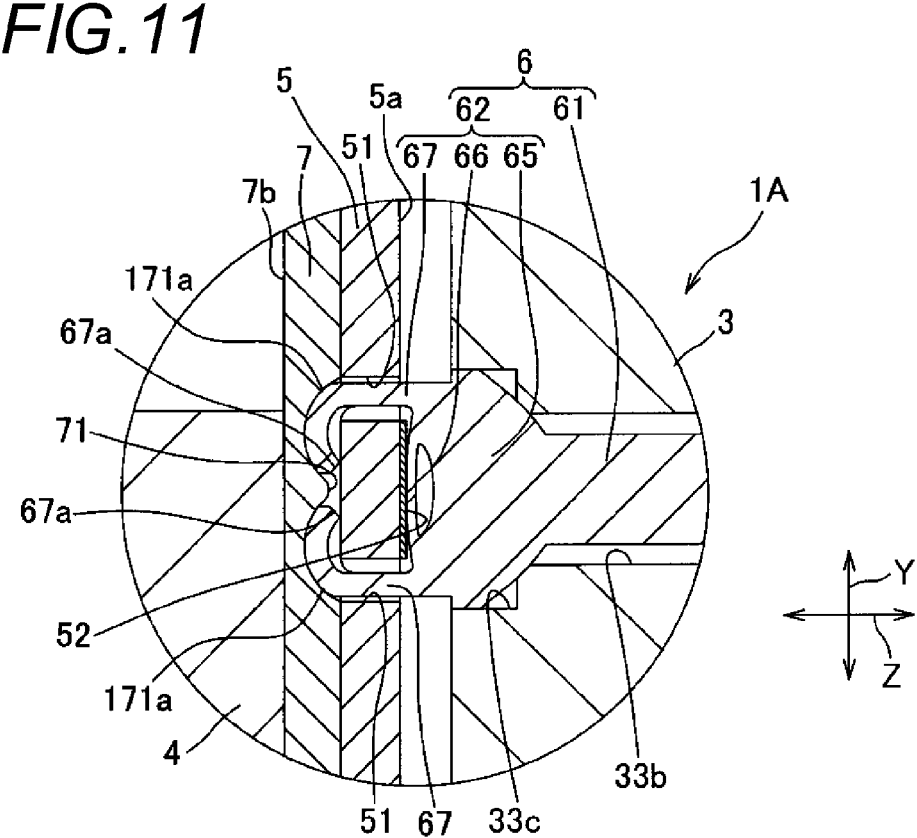
FIG. 11 is an enlarged view illustrating a modified example of the CCD camera unit illustrated in FIG. 1.
Figure 12:
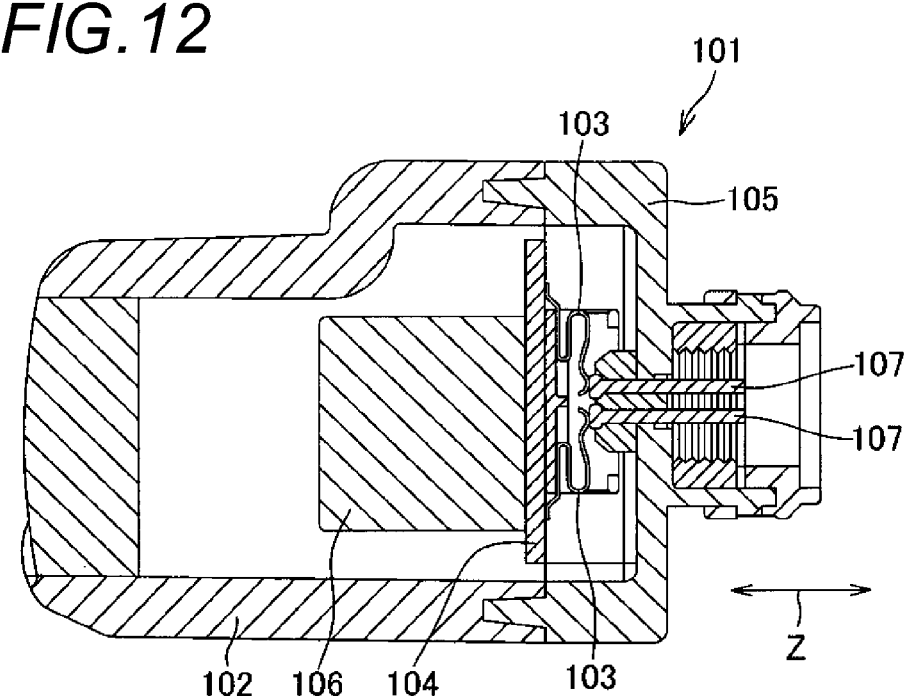
FIG. 12 is a perspective view of a conventional CCD camera unit.
Figure 13:
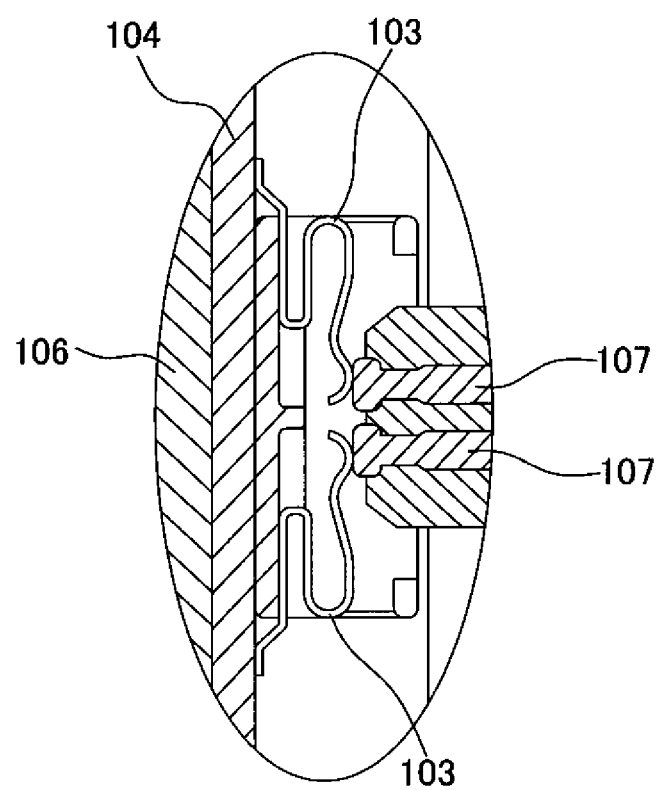
FIG. 13 is an enlarged view illustrating an enlarged main portion illustrated in FIG. 12.

According to the above-mentioned embodiment, each concave portion 71 of the plate 7 is formed with the inclined portions 71a. However, the present invention is not limited to this configuration, but as in a CCD camera unit 1A illustrated in FIG. 11, there may be provided a pair of curved portions 171a each formed into a curve along which the pair of arm portions 67 comes closer to each other as the arm portions 67 move away from the surface 7a. Also, in FIG. 11, the same parts as those in the above-mentioned embodiment are denoted by identical symbols, and a description thereof will be omitted.

According to the above-mentioned CCD camera unit 1A, the ends 67a of the pair of arm portions 67 are guided along the curved portions 171a, and bent toward the spring member 66. With the provision of the inclined portions 171a, the circuit board 5 and the connection terminals 6 can be connected to each other by the easy work of pushing the connection terminals 6 against the plate 7.

Also, according to the above-mentioned embodiment, the camera lens element 4 is used as the circuit element. However, the present invention is not limited to this configuration, but is applicable to a variety of circuit elements or circuit parts of microcomputers to be connected to the circuit board 5.

Also, the above-mentioned embodiments merely represent the typical configuration of the present invention, and the present invention is not limited to the embodiments. That is, the present invention can be implemented with various modifications without departing from the outline of the present invention.

The present invention is based on Japanese Patent Application No. 2010-093346 filed on Apr. 14, 2010, and content thereof is incorporated herein by reference.

INDUSTRIAL APPLICABILITY

According to the electrical component of the present invention, even when the above-mentioned automobile vibrates during traveling, the spring member maintains the stable contact load, as a result of which the excellent connection state of the circuit board 5 and the connection terminals 6 connected with the circuit board 5 can be kept.

REFERENCE SIGNS LIST

1, 1A, CCD camera unit (electrical component)
4, camera lens element (circuit element)
5, circuit board
6, connection terminal
7, plate
65, main body
66, spring member
67, arm portion
67a, end
7a, surface
71, concave portion
71a, inclined portion
171a, curved portion
arrow Z, two directions
arrow Y, direction along which a pair of arm portions come closer to each other

The invention claimed is:

1. An electronic component comprising:
 a circuit element;
 a circuit board that is connected to the circuit element; and
 a connection terminal that is connected to the circuit board, wherein the connection terminal includes:
  a main body;
   a spring member, disposed on the main body and elastically deformable in two directions including a direction of moving closer to the circuit board and a direction of moving away from the circuit board; and
  a pair of arm portions that extending from the main body with the spring member provided therebetween; and
 wherein when the pair of arm portions are inserted through the circuit board, ends of the respective arm portions distal from the main body are bent toward the spring member such that the circuit board is held between the ends of the respective arms and the spring member.

2. The electrical component according to claim 1, wherein an insulating plate is disposed between the circuit board and the circuit element;
 wherein a concave portion that is recessed in a surface of the insulating plate on which the circuit board is placed is formed in the insulating plate at a position facing the connection terminal; and
 wherein an inner peripheral surface of the concave portion is formed with a pair of inclined portions that is inclined in a direction of moving the pair of arm portions closer to each other as the inclined portions move farther from the surface or a pair of curved portions formed in a direction of moving the pair of arm portions closer to each other as the curved portions move away from the surface, at a position that abut against the ends of the pair of arm portions.

3. The electrical component according to claim 1, wherein the arms extend longitudinally with respect to a wire connected to the connector terminal.

4. The electrical component according to claim 1, wherein an insulating plate is disposed between the circuit board and the circuit element; and
 wherein a concave portion that is recessed in a surface of the insulating plate on which the circuit board is placed is formed in the insulating plate at a position facing the connection terminal.

5. The electrical component according to claim 4, wherein the pair of arm portions are bent toward the spring member by the concave portion of the insulating plate.

* * * * *